United States Patent
Pawelczyk et al.

(10) Patent No.: US 12,330,812 B2
(45) Date of Patent: Jun. 17, 2025

(54) SYSTEM AND METHOD FOR TETHERED UNMANNED AERIAL VEHICLE TAKEOFF, LANDING, AND STORAGE

(71) Applicant: Dragonfly Pictures, Inc., Essington, PA (US)

(72) Inventors: Joseph Pawelczyk, Philadelphia, PA (US); Kris Auker, Springfield, PA (US); Trevor Stephens, Brookhaven, PA (US); Jeffrey Field, Springfield, PA (US); James Megariotis, Delran, NJ (US)

(73) Assignee: Dragonfly Pictures, Inc., Essington, PA (US)

( * ) Notice: Subject to any disclaimer, the term of this patent is extended or adjusted under 35 U.S.C. 154(b) by 151 days.

(21) Appl. No.: 17/824,190

(22) Filed: May 25, 2022

(65) Prior Publication Data
US 2023/0082712 A1    Mar. 16, 2023

Related U.S. Application Data

(60) Provisional application No. 63/193,045, filed on May 25, 2021.

(51) Int. Cl.
| | |
|---|---|
| *B64F 1/222* | (2024.01) |
| *B64C 1/06* | (2006.01) |
| *B64C 39/02* | (2023.01) |
| *B64U 10/60* | (2023.01) |
| *B64U 70/00* | (2023.01) |
| *B64U 70/99* | (2023.01) |

(Continued)

(52) U.S. Cl.
CPC .............. *B64F 1/222* (2013.01); *B64C 1/061* (2013.01); *B64C 39/022* (2013.01); *B64C 39/024* (2013.01); *B64U 10/60* (2023.01); *B64U 70/99* (2023.01); *B64U 80/30* (2023.01); *B64U 80/82* (2023.01); *B64U 70/00* (2023.01); *B64U 2201/104* (2023.01); *B64U 2201/202* (2023.01)

(58) Field of Classification Search
CPC ........ B64U 70/99; B64U 80/30; B64U 80/70; B64U 2201/202
See application file for complete search history.

(56) References Cited

U.S. PATENT DOCUMENTS

| | | | |
|---|---|---|---|
| 2010/0256841 A1 | 10/2010 | Garrec | |
| 2016/0039541 A1* | 2/2016 | Beardsley | ............... B60L 53/14 701/2 |

(Continued)

*Primary Examiner* — Nicholas McFall
(74) *Attorney, Agent, or Firm* — Riverside Law LLP

(57) ABSTRACT

A method of aligning an aircraft with a landing platform in motion comprises measuring a GPS heading with at least one GPS sensor positioned at a known location relative to the landing platform while the landing platform is in motion, measuring an orientation of the aircraft with an orientation sensor fixed relative to the aircraft, calculating an orientation of the landing platform from the GPS heading, calculating an orientation offset between the measured orientation of the aircraft and the calculated orientation of the landing platform, and changing an orientation of the aircraft or the landing platform to reduce the orientation offset. A system for landing and securing an aircraft in an enclosure, a system for disconnecting a tether from an aircraft, and a system for landing an aircraft in an enclosure are also described.

15 Claims, 8 Drawing Sheets

(51) Int. Cl.
*B64U 80/30* (2023.01)
*B64U 80/82* (2023.01)

(56) References Cited

U.S. PATENT DOCUMENTS

| | | |
|---|---|---|
| 2016/0200437 A1 | 7/2016 | Ryan |
| 2018/0194491 A1* | 7/2018 | Fisher .................... B64F 1/005 |
| 2019/0023416 A1* | 1/2019 | Borko .................. B65G 1/0485 |
| 2019/0161190 A1 | 5/2019 | Gil |
| 2019/0187724 A1 | 6/2019 | Li |
| 2020/0207470 A1* | 7/2020 | Brock .................... B64U 70/99 |
| 2021/0080946 A1 | 3/2021 | Andreas |

* cited by examiner

100

SYSTEM AND METHOD FOR TETHERED UNMANNED AERIAL VEHICLE TAKEOFF, LANDING, AND STORAGE

CROSS-REFERENCE TO RELATED APPLICATIONS

This application claims priority to U.S. Provisional Patent Application No. 63/193,045, filed on May 25, 2021, incorporated herein by reference in its entirety.

STATEMENT REGARDING FEDERALLY SPONSORED RESEARCH OR DEVELOPMENT

This invention was made with government support under contract no. FA8075-14-D-0014 awarded by the Defense Contract Management Agency. The government has certain rights in the invention.

BACKGROUND OF THE INVENTION

Unmanned tethered, powered aircraft present unique engineering challenges due to their small size, light weight, and maneuverability. Tethered aircraft can be difficult to control, because of forces and moments imparted onto the vehicle by the tether. Maneuvering a tethered, powered aircraft, for example during takeoff and landing, is further complicated by the un-aerodynamic nature of multi-rotor aircraft.

Enclosures or landing platforms may, for example, impose stringent requirements on vehicle orientation during or at the end of approach. Once landed, a light aircraft cannot necessarily rely on the force of gravity to keep it stationary when for example the landing platform may be in motion or under high winds.

Landing and capturing small tethered aircraft on a platform into an enclosure, which may itself be in motion at the time of landing, is therefore an exceedingly difficult problem. Thus, there is a need in the art for a takeoff, landing, and storage platform and accompanying architecture configured to work while in motion to allow for safe takeoff, landing, and storage of an unmanned, tethered aircraft. The present invention overcomes the various disadvantages of existing systems and satisfies that need.

SUMMARY OF THE INVENTION

In one aspect, a method of aligning an aircraft with a landing platform in motion comprises measuring a GPS heading with at least one GPS sensor positioned at a known location relative to the landing platform while the landing platform is in motion, measuring an orientation of the aircraft with an orientation sensor fixed relative to the aircraft, calculating an orientation of the landing platform from the GPS heading, calculating an orientation offset between the measured orientation of the aircraft and the calculated orientation of the landing platform, and changing an orientation of the aircraft or the landing platform to reduce the orientation offset.

In one embodiment, the at least one GPS sensor comprises at least two GPS sensors fixed relative to the landing platform. In one embodiment, the orientation sensor comprises at least one of a GPS sensor, an inertial measurement unit (IMU), a compass, a gyroscope, or an accelerometer. In one embodiment, the method further comprises changing an orientation of the aircraft via a yaw motion. In one embodiment, the at least one GPS sensor is fixedly attached to the landing platform. In one embodiment, the method further comprises maintaining the orientation of both the aircraft and the landing platform when the calculated orientation offset is below a threshold. In one embodiment, the threshold is 5 degrees.

In one aspect, a system for landing and securing an aircraft in an enclosure comprises an aircraft having an airframe, the airframe comprising at least one aperture, an enclosure having a retractable lid, a landing platform, and at least one landing lock element, the at least one landing lock element being configured to controllably move between an opened and a closed position, and a controller configured to move the landing lock elements to the closed position, extending at least a portion of the landing lock element through the at least one aperture, when the aircraft has landed on the landing platform, the controller further configured to close the lid when the at least one landing lock element is in the closed position.

In one embodiment, the lid has inner and outer sides, further comprising a cushioned element positioned on the inner side. In one embodiment, the aircraft is communicatively connected to the controller. In one embodiment, the aircraft is communicatively connected to the controller via a tether. In one embodiment, the at least one landing lock element comprises a servo. In one embodiment, the at least one landing lock element comprises at least two landing lock elements.

In one aspect, a system for disconnecting a tether from an aircraft comprises an aircraft comprising a first connector, a tether comprising a second connector configured to be removably attached to the first connector, forming a connection between the aircraft and a tether, a disconnect bracket fixedly attached to the first or second connectors, a disconnect actuator fixedly attached to the aircraft, having an actuating element configured to make contact with the disconnect bracket, and a controller configured to actuate the disconnect actuator, causing the actuating element to make contact with the disconnect bracket and disconnect the first connector from the second connector, severing the connection between the aircraft and the tether.

In one embodiment, the disconnect actuator comprises a solenoid. In one embodiment, the disconnect bracket comprises a hollow section configured to surround the first or second connector, and a contact surface positioned orthogonal to the hollow section.

In one aspect, a system for landing an aircraft in an enclosure comprises an enclosure comprising a landing platform comprising a landing cavity, the landing cavity defining an opening in the landing platform, the opening having a shape of a regular polygon having N corners and N sides, and an aircraft having an airframe having a top end and a bottom end, the airframe having N booms, the N booms extending outward from the airframe along an angle from the bottom end to the top end defining a tapered shape, wherein the landing cavity is configured to receive the aircraft in an orientation such that when the aircraft is at rest on the landing platform, each of the N booms is proximate to one of the N corners of the opening, and wherein N is a number greater than 2.

In one embodiment, when the aircraft is at rest on the landing platform, at least two of the N booms are in direct contact with the opening. In one embodiment, N is 4. In one embodiment, the system further comprises a propeller at the top end of each boom. In one embodiment, the opening of the landing cavity comprises an outer edge comprising a low-friction material. In one embodiment, the N booms comprise a low-friction material on an outer surface.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1A:
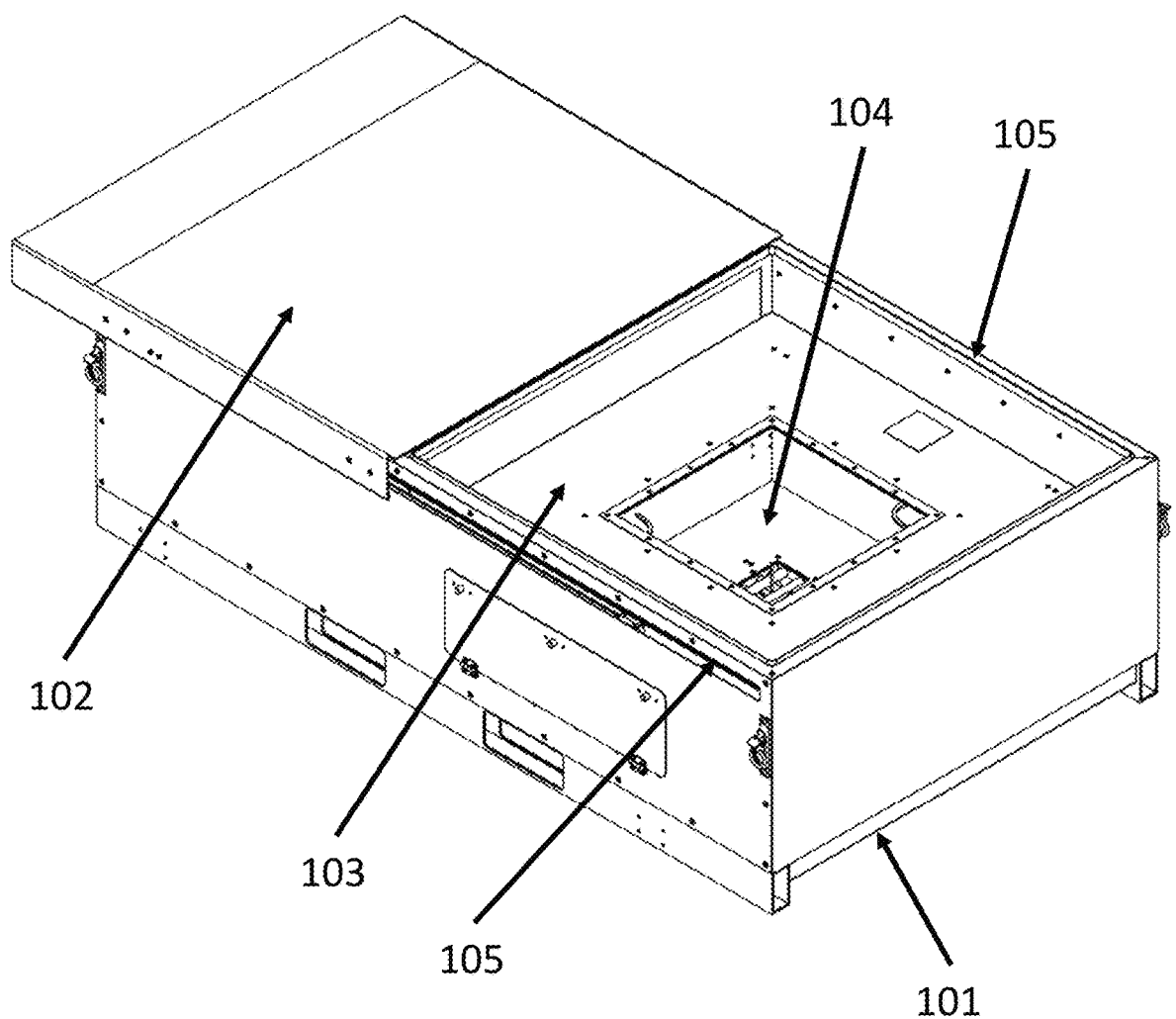
FIG. 1A is a diagram of an exemplary enclosure with the lid open.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

A system of the present invention may in some instances be referred to as a Tethered Unmanned Aerial System (TUAS or TeUAS), having as its components an Unmanned Aerial Vehicle (UAV or Drone) and a Tether Management System Enclosure (TMSE). Certain exemplary embodiments may be presented with reference to one or more different kinds of UAVs or Drones, for example a four rotor or eight rotor UAV or Drone. Such references are not meant to be limiting, and it is understood that systems and methods of the present invention may be used with any aerial vehicle, with any rotor configuration and any power train known in the art.

Systems of the present invention may further include one or more signaling antennas, configured to broadcast signals originating from a TMSE or airborne radio from a higher altitude, and thus increasing the range of the signal. Similarly, higher altitude antennas and radios are capable of receiving signals broadcast from further away. In some embodiments, particularly in situations where communication is highly directional, directional antennas may be used with systems and methods of the present invention. For example, in one embodiment, an antenna of the present invention has a beam sweep of 30 degrees horizontal by 30 degrees vertical. As discussed herein, "beam sweep" refers to the radiation pattern or antenna pattern used to describe the directional dependence of the strength of radio waves from the antenna or other source. Conventional systems manage directional antennas by separately rotating the antenna, or positioning the antenna on an actuated gimbal assembly to point the antenna appropriately at the one or more targets. Some embodiments of the present invention include an advantageous alternative, because directional antennas may be oriented by changing the pitch, yaw, roll, attitude, or altitude of a UAV of the present invention, thus allowing for dynamic repositioning of the one or more antennas in response to external stimuli. In some embodiments, a UAV of the present invention is configured to autonomously maintain an attitude and altitude optimal for maintaining the direction of the beam sweeps of one or more antennas. Such a configuration has the further advantage of removing unnecessary weight and complexity from the UAV, which would otherwise require one or more coaxial cable slip rings to allow for dynamic orientation of the one or more signaling antennas.

With reference to FIG. 1A, an exemplary enclosure 101 for a TMSE 100 is shown. The exemplary enclosure 101 includes a lid 102 which may for example slide between an open position and a closed position along rails 105 to reveal or enclose upper landing platform 103 and lower landing cavity 104. Lid 102 in FIG. 1A is shown in an open position. The upper landing platform 103 and lower landing cavity 104 shown in FIG. 1A are squares, but in some embodiments, one or both of upper landing platform 103 and lower landing cavity 104 may have any other suitable shape, for example but not limited to rectangular, triangular, hexagonal, octagonal, decagonal, or any other suitable shape. In some embodiments, one or both of lower landing cavity 104 and upper landing platform 103 are regular polygons. In some embodiments, one or both of the lower landing cavity 104 and the upper landing platform 103 are regular polygons having N sides and N corners where N is a number greater than 2, greater than 3, greater than 4, greater than 5, greater than 6, or greater than 7. In some embodiments, one or both of the lower landing cavity 104 and the upper landing platform 103 may comprise one or more cutouts or notches, for example in order to accommodate payloads which may require additional room.

Lid 102 is shown attached via rails 105 to enclosure 101, but it is understood that lid 102 may be attached and operable to enclose the upper landing platform 103 and lower landing cavity 104 via any method, including but not limited to folding, collapsing (for example accordion-style), or swinging, for example about one or more hinges. In some embodiments, the rails 105 may be protected by one or more brushes or rubber seals to protect or insulate them from the elements, for example rain, ice, sand, etc.

Figure 1B:
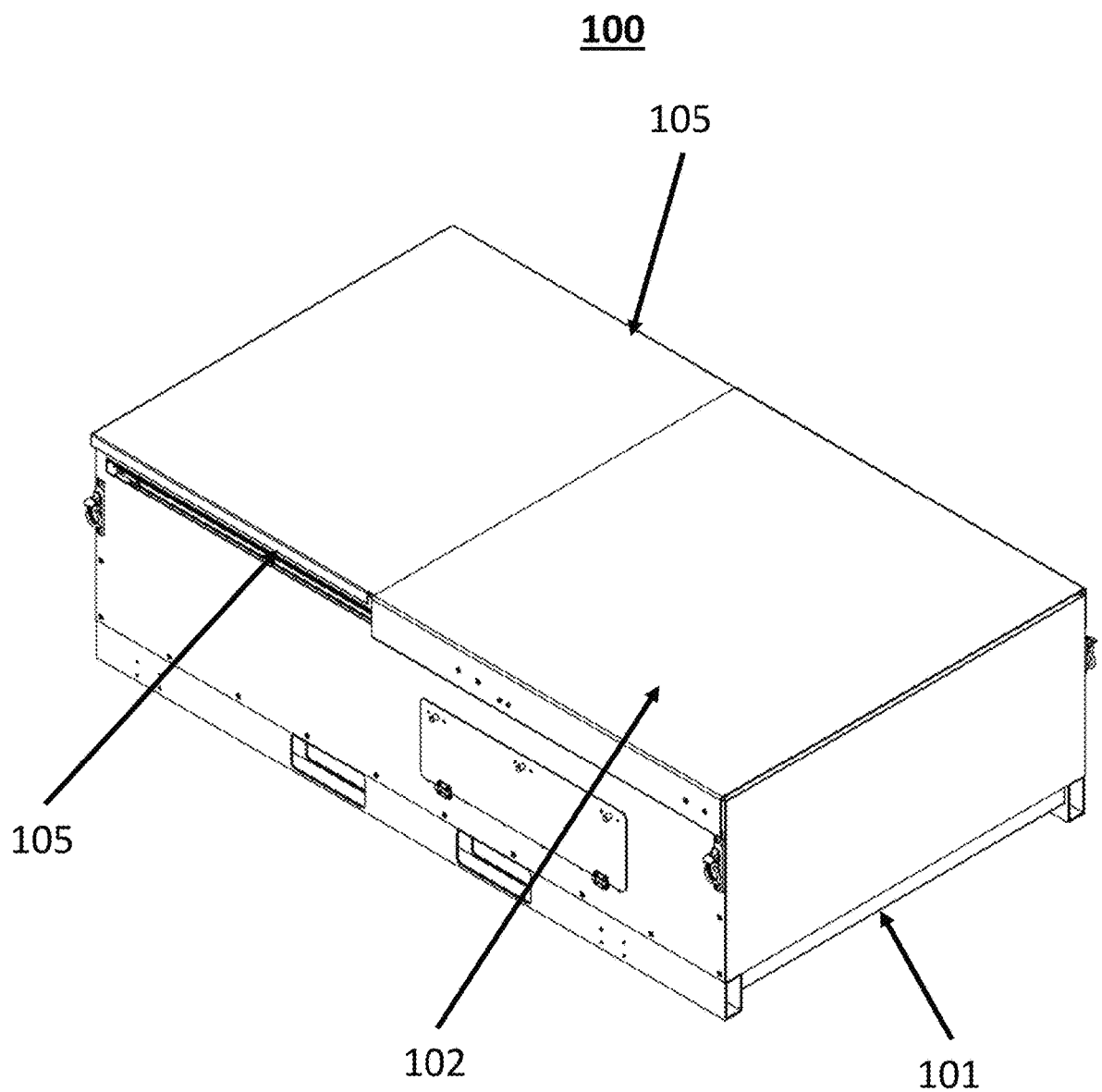
FIG. 1B is a diagram of an exemplary enclosure with the lid closed.

With reference to FIG. 1B, an enclosure 101 is shown with lid 102 in a closed position. In the view of FIG. 1B, exemplary rails 105 are shown along the full length of the enclosure 101. In some embodiments, the lid 102 and/or the enclosure 101 may comprise a locking mechanism to keep the lid 102 in a fully open and/or closed position. A locking mechanism may comprise for example a solenoid or other system for holding the lid 102 in place. In some embodiments, a lid may include a cushioned element on the underside of the lid facing the lower landing cavity 104, With reference to FIG. 2, an overhead view of an exemplary top landing platform 103 and lower landing cavity 104 is shown, illustrating two features present in some embodiments of the device. The first feature is the dual GPS sensors 202 positioned on a top surface of the landing platform on opposite sides of the lower landing cavity, and the second is the landing lock servos 201 on opposite corners of the lower landing cavity.

A landing/storage enclosure 101 may advantageously be equipped with one or more location sensors, for example GPS receivers for monitoring the position and heading of the enclosure where the enclosure 101 is mobile. However, an additional or primary function of the dual GPS sensors 202 is to provide a high-resolution GPS heading, and therefore an orientation, of the lower landing cavity. As would be understood by one skilled in the art, in order for a four-cornered or other shaped airframe to land successfully in a cavity having the same or a similar shape depends on the orientation being correct or within an acceptable range. If, for example, a square aircraft were to approach a square landing cavity at an offset angle of 45 degrees, the corners of the aircraft would bounce off the sides of the cavity, and the landing would be unsuccessful, potentially damaging the aircraft or the cavity or both. In order to minimize the likelihood of such an error, some embodiments of enclosures disclosed herein are equipped with one or more GPS receivers fixedly mounted at known locations relative to the lower landing cavity, so that when the enclosure 101 is in motion, the GPS receivers 202 provide constantly updating GPS heading information to a controller, for example a control unit positioned within the enclosure and communicatively connected both to the landing-platform mounted GPS receivers and to a flight controller or other controller on the tethered aircraft. The aircraft, which may also be configured to provide an orientation measurement or a high-resolution GPS heading while it is in motion, may then match its orientation to that of the enclosure, in order to ensure that any approach and landing is successful. In some embodiments, the aircraft may measure or calculate its orientation via one or more of a GPS sensor, an inertial measurement unit (IMU), a compass, a gyroscope, or an accelerometer. In some embodiments, a control system may be configured to maintain an aircraft orientation of less than 10 degrees offset from an orientation of the lower landing cavity, or less than 20 degrees offset, or less than 15 degrees offset, or less than 8 degrees offset, or less than 7, less than 6, less than 5, less than 4, or less than 3 degrees offset. In some embodiments, the aircraft may be communicatively connected to a computing device located in the landing platform, for example via a tether, and the aircraft may communicate its orientation to the landing platform (and/or the platform may communicate its orientation to the aircraft) via the communication connection and/or tether. In some embodiments, the aircraft may communicate its orientation to a computing device located in the landing platform, and the computing device may reply with an orientation offset or instructions to the aircraft to change its orientation relative to the landing platform or the ground.

In some embodiments, a method of the disclosure may include the steps of calculating a heading of a tethered aircraft and a heading of an enclosure connected to the tethered aircraft via a tether, calculating an orientation of the aircraft from the heading and an orientation of the enclosure from its heading, calculating an offset of the orientation of the tethered aircraft from the orientation of the enclosure, and adjusting an orientation of one of the enclosure or the aircraft or both to reduce the offset below an acceptable threshold. For example, in some embodiments a tethered aircraft may adjust its yaw to match an orientation with the enclosure. In other embodiments, an enclosure may for example be mounted on a rotatable platform communicatively connected to a controller, and the platform may reorient the enclosure to match the orientation of the aircraft.

Figure 3:
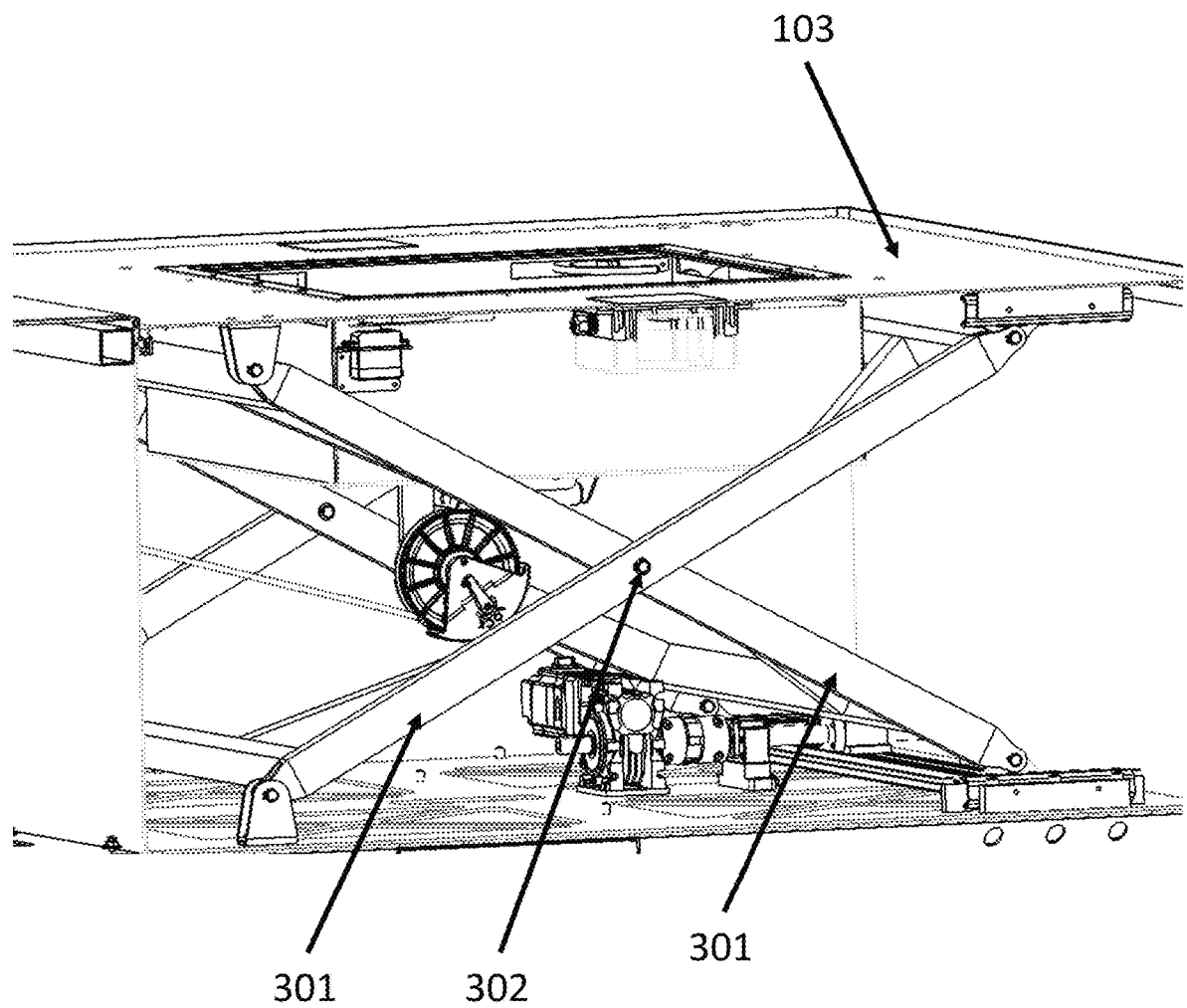
FIG. 3 is a cutaway view of a retractable landing platform of an exemplary enclosure.

With reference to FIG. 3, a side cutaway view of enclosure 101 is shown, revealing a mechanism for raising and lowering upper landing platform 103. Upper landing platform 103 can be lowered by a height such that lid 102 may be closed to fully enclose an aircraft within enclosure 101. Upper landing platform 103 can also be raised by a height to facilitate takeoff and landing of an aircraft. In some embodiments, upper landing platform 103 can be raised by a height such that a top surface of upper landing platform 103 is flush with a top surface of enclosure 101, or by a height such that upper landing platform 103 extends past a top surface of enclosure 101. In some embodiments, the mechanism for raising and lowering upper landing platform 103 is a scissor lift, wherein upper landing platform 103 may be supported by a plurality of folding supports 301 linked together by hinges 302. As would be understood by persons having skill in the art, a scissor lift is configured to raise and lower a platform while maintaining a level orientation of the platform. Accordingly, a support 301 may be attached at a first end to a hinge that is slidably attached to an interior of enclosure 101 or upper landing platform 103 to compensate for changes in dimensions in the scissor lift mechanism as it raises and lowers upper landing platform 103. The opposing second end of a support 301 may be attached to a hinge that is slidably attached or fixedly attached to an interior of enclosure 101 or upper landing platform 103. It should be understood that while enclosure 101 is depicted with a scissor lift, any mechanism for raising and lower upper platform 103 may be used, including but not limited to rack and pinion mechanisms, screw thread mechanisms, telescoping piston mechanisms, wire and pulley mechanisms, or an actuated bar mechanism, for example an actuated four-bar mechanism, and the like.

As described elsewhere herein, lower landing cavity 104 is set into upper landing platform 103 and is configured to receive and house an aircraft, such as a UAV. Lower landing cavity 104 comprises a shape having a rotational symmetry such that aircraft may approach lower landing cavity 104 and be seated within lower landing cavity 104 from any orientation. Lower landing cavity 104 thereby comprises an opening formed from a plurality of edges 203 joined by a plurality of corners. Certain aircraft may comprise an airframe having a lower geometric shape matched to lower landing cavity 104 or an airframe with a landing structure having a geometric shape matched to lower landing cavity 104, wherein the airframe or landing structure comprises tapered or sloping surfaces. Upon physically contacting one or more edges 203 of lower landing cavity 104, the tapered or sloping surfaces of the airframe or landing structure are configured to take a path of least resistance by sliding along the one or more edges 203 towards a corner of lower landing cavity 104. The engagement between an aircraft and the one or more edges 203 of lower landing cavity 104 thereby self-centers and self-orients an aircraft entering lower landing cavity 104 as the tapered or sloping surfaces of the airframe or landing structure are seated within the corners of lower landing cavity 104. In some embodiments, the edges 203 of the lower landing cavity 104 may comprise a low friction material, for example nylon.

Figure 2:
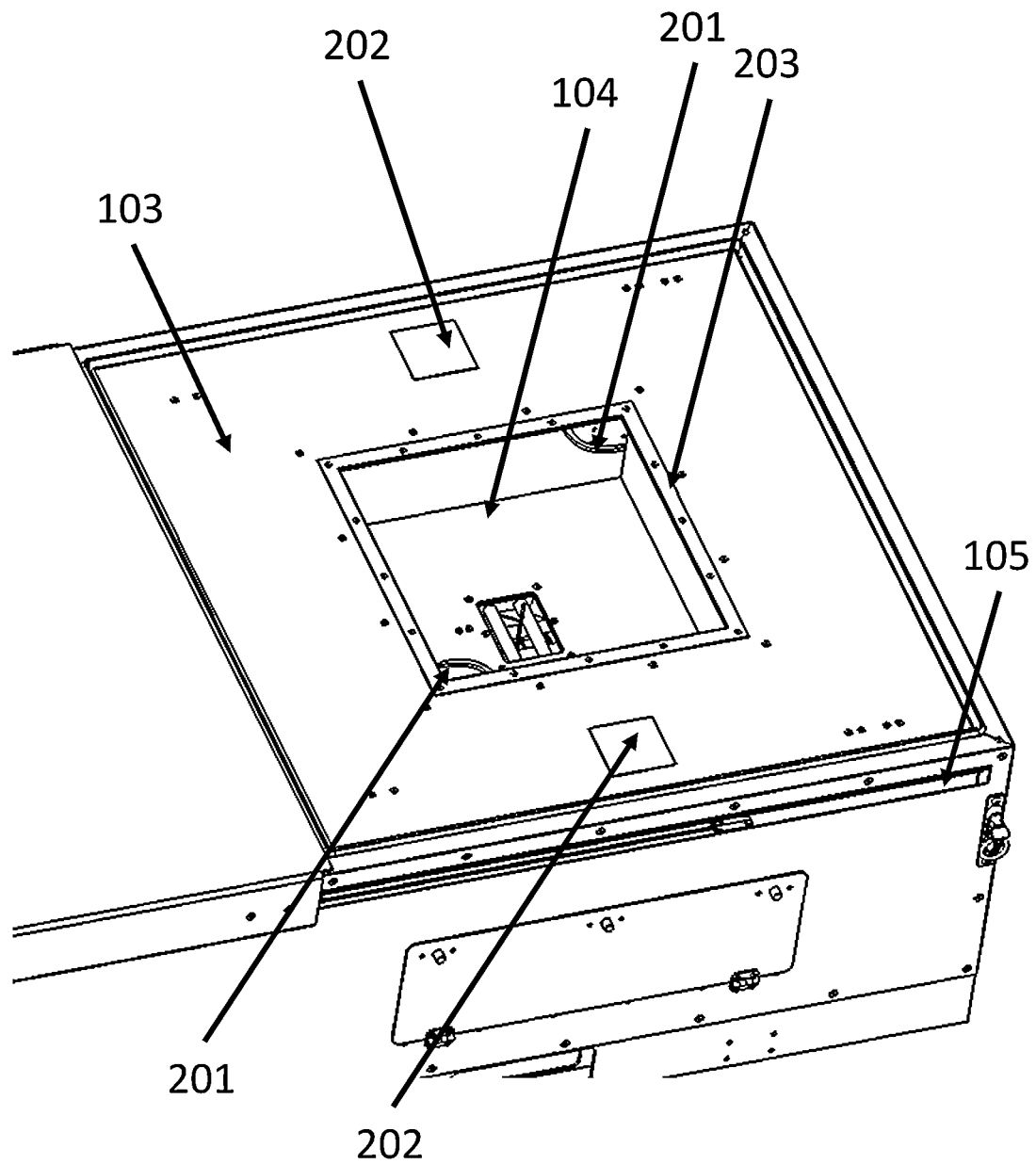
FIG. 2 is a detail view of a landing platform of an exemplary enclosure.
Figure 6:
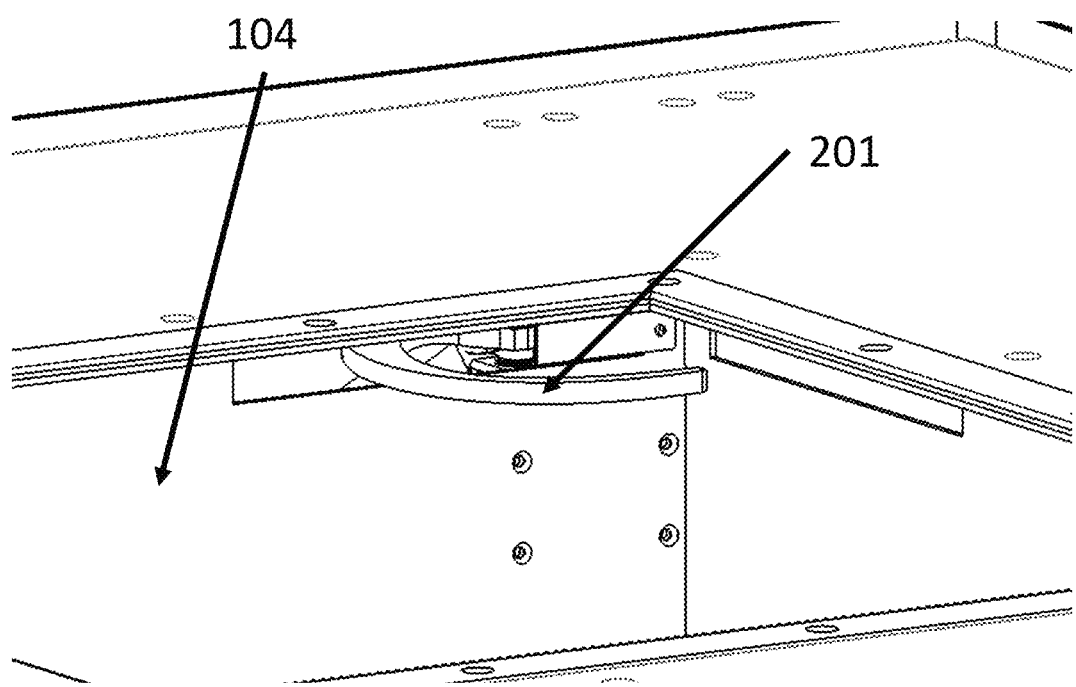
FIG. 6 is a detail view of an exemplary landing lock of an exemplary enclosure.
Figure 7:
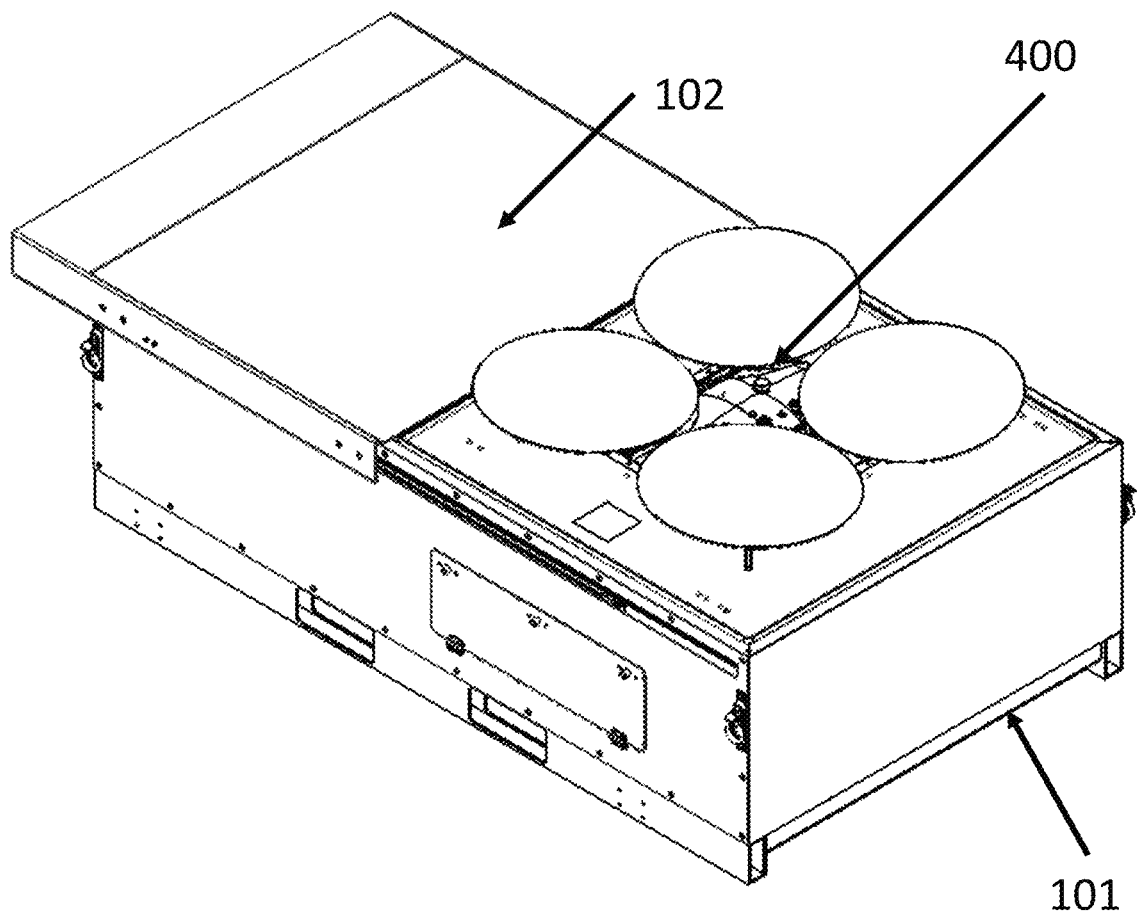
FIG. 7 is a diagram of an exemplary enclosure with an aircraft positioned on the landing platform.
Figure 8:
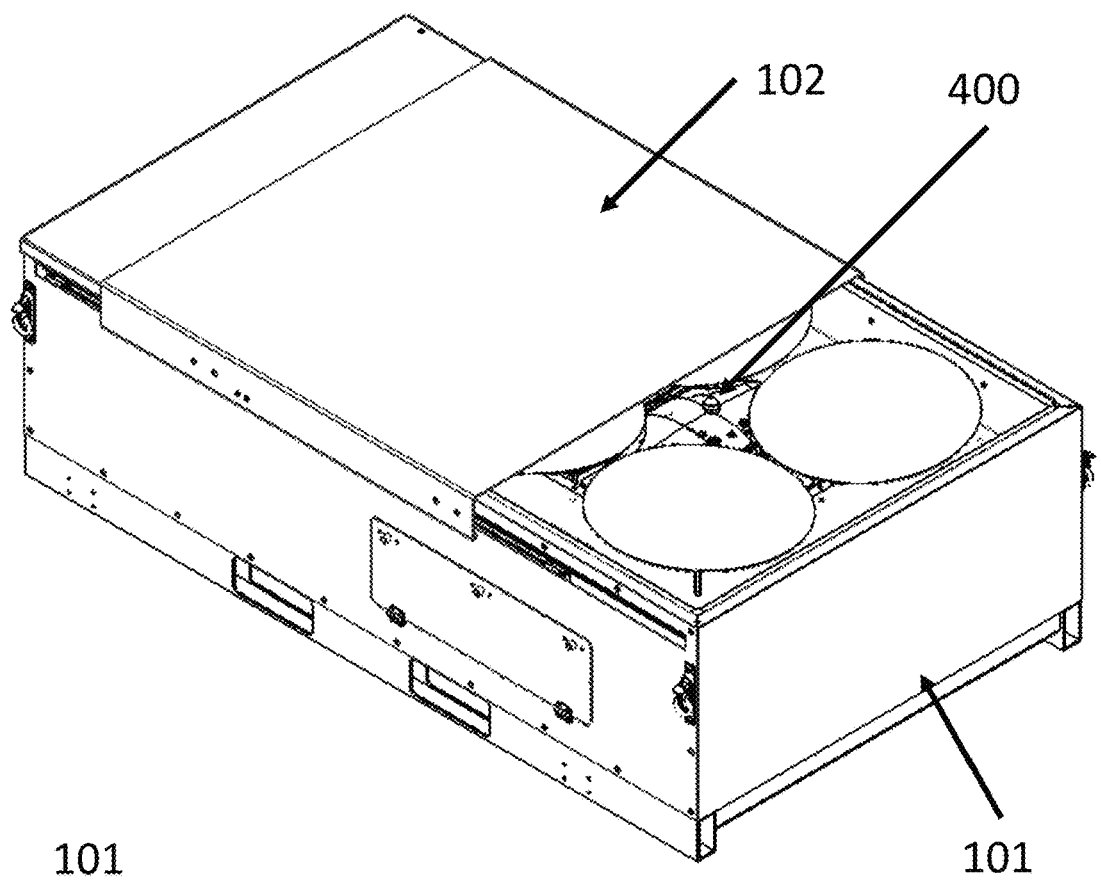
FIG. 8 is a diagram of an exemplary enclosure with an aircraft positioned on a retracted landing platform with the lid partially closed.

Landing lock servos 201 are provided in lower landing cavity 104 to further secure a seated aircraft, wherein each landing lock servo 201 comprises a retractable rail configured to extend from an opening and into a slot. For example, with reference to FIG. 6, an exemplary landing lock servo 201 is shown having a curved retractable rail that is rotatable out of an opening into an adjacent slot. While FIG. 2 depicts an exemplary lower landing cavity 104 comprising two landing lock servos 201 in opposite corners of a square-shaped lower landing cavity 106, it should be understood that lower landing cavity 106 can comprise any number of landing lock servos 201 in any desired placement. For example, as described above, an aircraft having a compatible airframe or landing structure may self-center and self-orient within lower landing cavity 106 such that tapered or sloping surfaces of the airframe or landing structure are guided into corners of lower landing cavity 106. Landing lock servos 201 may advantageously be positioned at one or more corner of lower landing cavity 106, wherein a retractable rail may be extended from an opening, through the airframe or landing structure, and into a slot to hold an aircraft in place within lower landing cavity 104. In certain embodiments, one or more additional landing lock servos 201 may be provided throughout enclosure 101 to secure a component of an aircraft in a similar manner.

Figure 4:
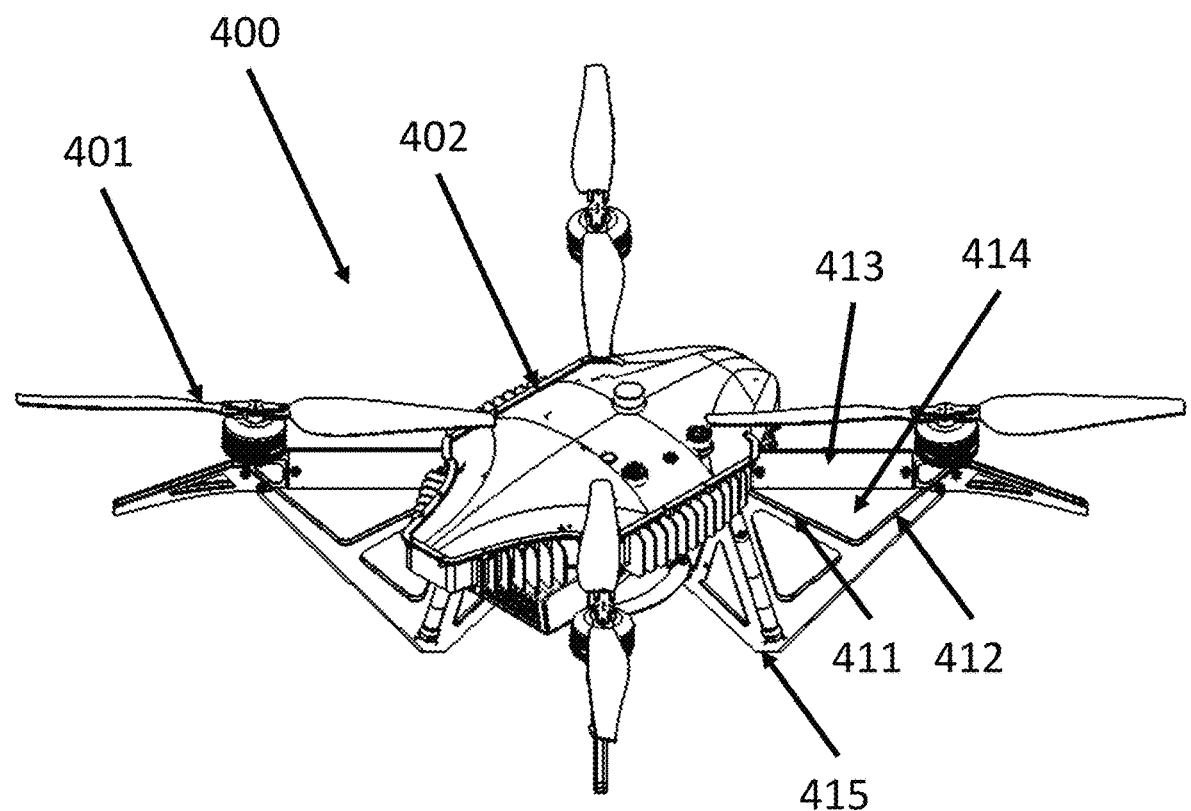
FIG. 4 is a diagram of an exemplary aircraft.

With reference to FIG. 4, an exemplary UAV 400 is shown, illustrating an aircraft having an airframe and landing structures compatible for self-centering and self-orienting within lower landing cavity 106. UAV 400 comprises a body 402 from which extends a plurality of booms 413, each boom 413 comprising a propeller 401 at an outer end, as would be understood by persons having skill in the art. Landing gear 415 is positioned on an underside of UAV 400, whereupon a truss 412 extends between a bottom end of landing gear 415 and an outer end of boom 413, and a buttress 411 extends from body 402 and connects to a position along truss 412. The connections between body 402, buttress 411, truss 412, boom 413, and landing gear 415 forms several apertures 414 between each element. Each truss 412 is formed at an angle that extends from an inward bottom end of landing gear 415 and an outward end of boom 413, thereby forming a tapered or sloping surface of UAV 400. Accordingly, UAV 400 may self-center and self-orient when approaching a lower landing cavity 106 by physically contacting a truss 412 against an edge 203 of lower landing cavity 106 and sliding along the edge 203 to seat within a corner of lower landing cavity 106. In some embodiments, one or more of booms 413 may comprise a low-friction material, for example nylon. In some embodiments, one or more of booms 413 may comprise a protrusion extending outward from the boom, forming a contact surface, the contact surface comprising, being formed from, or being coated with a low-friction material. In some embodiments, a boom 413 may comprise a low-friction protrusion having a material that matches a material from which edge 203 of lower landing cavity 106 is coated or composed from.

Figure 9:
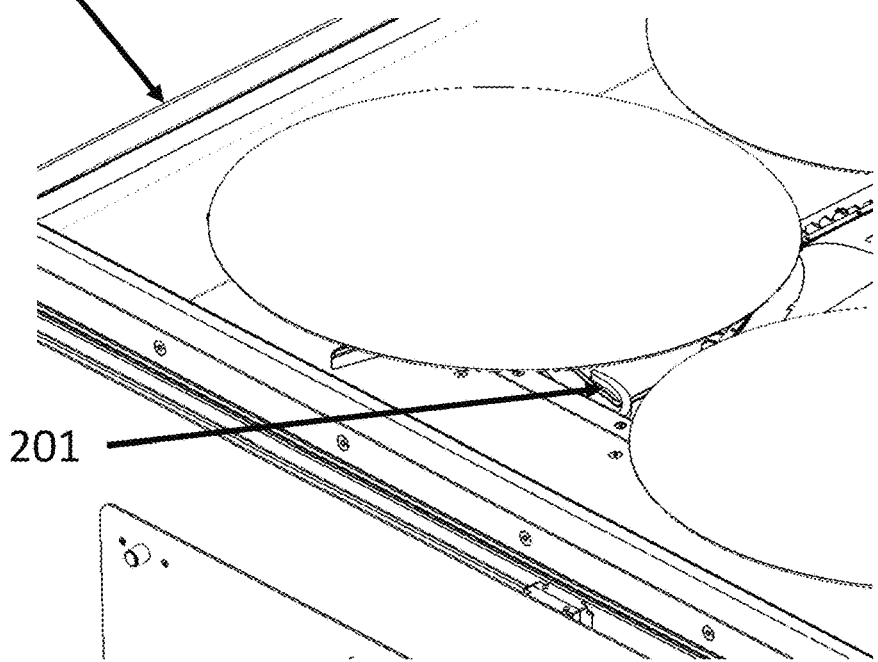
FIG. 9 is a detail view of a landing lock securing an aircraft in an enclosure.
Figure 10:
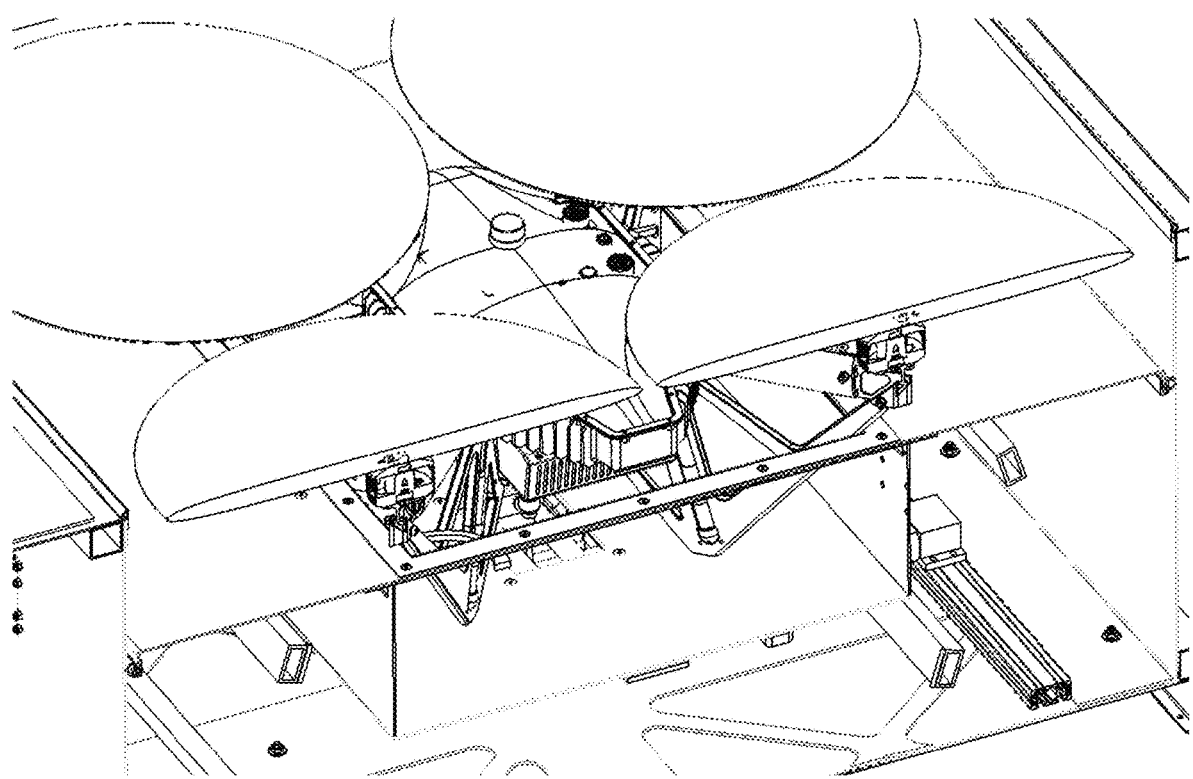
FIG. 10 is a cutaway view of an exemplary aircraft positioned in an enclosure.

After landing, UAV 400 may be secured within lower landing cavity 106 by actuating one or more landing lock elements, which may for example be landing lock servos 201, wherein the retractable rails of each of the landing lock servos 201 may extend through one or more of the apertures 414 formed on UAV 400 (visible in FIG. 9, FIG. 10). While UAV 400 is depicted in FIG. 4 as comprising built-in buttresses 411, trusses 412, and landing gear 415, it should be understood that buttresses 411, trusses 412, and landing gear 415 may be provided separately, such as in a kit, to adapt any desired aircraft for landing and storage within enclosure 101.

In some embodiments, a method of the disclosure may relate to a takeoff procedure and/or a landing procedure. A takeoff procedure may include the steps of moving a lid from a closed position to an opened position, raising an upper landing platform, and releasing an aircraft from landing lock servos. Upon release, the aircraft may takeoff from the enclosure; for tethered aircraft, the tether may be fully released or meted out in controlled lengths. In some embodiments, the upper landing platform may be optionally lowered after takeoff, and the landing lock servos may be optionally closed after takeoff. A landing procedure may include the steps of preparing the enclosure to receive an aircraft, which may include optional steps of raising the upper landing platform (if previously in a lowered position) and opening the landing lock servos ((if previously in a closed position). A landing procedure may include the steps of receiving an aircraft in a lower landing cavity of an upper landing platform, whereby tapered or sloping surfaces of an airframe or landing structure is guided by edges of the lower landing cavity to seat within corners of the lower landing cavity, closing the landing lock servo to secure the aircraft to the enclosure, lowering the upper landing platform, and moving the lid to a closed position to fully enclose the aircraft within the enclosure. In various embodiments, one or more of the abovementioned steps may be performed manually (such as by activating a button or switch) or automatically (such as by communication between the aircraft and a coordinator computer). For example, in some embodiments a coordinator computer may communicate to an aircraft that landing lock servos have been opened, whereupon the aircraft takes off automatically to a holding position or other predetermined position. In a similar manner, an aircraft that has landed in a lower landing cavity may communicate to a coordinator computer that landing is completed, whereupon the coordinator computer automatically closes landing lock servos to secure the aircraft to the enclosure. In various embodiments, the steps may be carried out automatically in sequence or await a manual input to proceed to a subsequent step.

The landing procedure may include the steps of calculating a heading of a tethered aircraft and a heading of an enclosure connected to the tethered aircraft via a tether, calculating an orientation of the aircraft from the heading and an orientation of the enclosure from its heading, calculating an offset of the orientation of the tethered aircraft from the orientation of the enclosure, and adjusting an orientation of one of the enclosure or the aircraft or both to reduce the offset below an acceptable threshold. For example, in some embodiments a tethered aircraft may adjust its yaw to match an orientation with the enclosure. In other embodiments, an enclosure may for example be mounted on a rotatable platform communicatively connected to a controller, and the platform may reorient the enclosure to match the orientation of the aircraft.

One hazard presented by tethered UAVs is the risk of the tether becoming ensnared in the surrounding environment, or the aircraft otherwise being in an "unrecoverable" state. Examples of such states include loss of aircraft control, loss of tether reel control, emergency crash of the aircraft to prevent collision with manned assets, loss of power to the aircraft, or loss of communication to the aircraft. In such situations, keeping the aircraft attached to the tether and operating risks further damage to the aircraft, to the ship, or otherwise. For this reason, systems of the present invention may include an automated tether disconnect system, for example positioned on the aircraft, so that the tether can be easily disconnected and the aircraft switched to battery power in dangerous situations.

Figure 5:
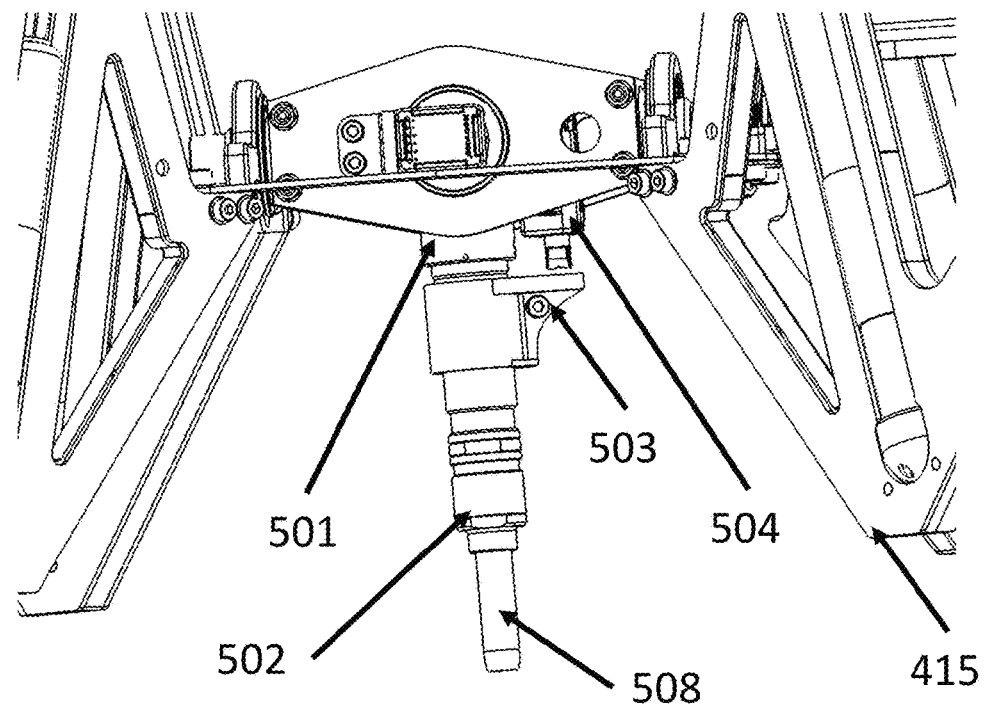
FIG. 5 is a detail view of an exemplary tether disconnect system.

An exemplary tether disconnect system is shown in FIG. 5, which is a lower partial view of the exemplary aircraft 400 shown in FIG. 4. The depicted tethered aircraft includes a tether 508 having first and second segments connected to one another via a connector 502 which fits into a receptacle 501. Any suitable connector may be used where suitable for a tether comprising the required conductors and fiber channels needed for operation of the aircraft 400. In one embodiment, the connector is a Society of Motion Picture and Television Engineers (SMPTE) connector, for example a hybrid electric-fiber optic push-pull SMPTE connector. In other embodiments, a ruggedized or miltary (MS, MIL-STD, or MIL-SPEC) connector may be used. In the depicted embodiment, the receptacle 501 is attached to the aircraft 400, whereas the connector 502 is attached to the TMSE via the tether 508. In some embodiments, during normal operation, the receptacle 501 and the connector 502 are electrically and (if applicable) optically connected.

In the depicted embodiment, the system further includes a disconnect bracket 503 and a disconnect actuator, which may for example be a solenoid 504, fixedly attached to the aircraft 400, configured to extend toward disconnect bracket 503 to release the connector 502 from the receptacle 501 and in so doing disconnect the vehicle from the tether 508. The bracket may in some embodiments include a hollow, cylindrical section configured to surround the tether 508 and/or the connector, and a contact surface, which may be a reinforced contact surface, positioned orthogonal to the hollow cylindrical section configured to make contact with the disconnect actuator and transfer the mechanical force of the solenoid to the necessary part of the connector 502 in order to effect the disconnection of the connector 502 from the receptacle 501. The tether 508 may be cylindrical, having a diameter of between 1-10 mm, or 2-8 mm, or 2-6 mm, or 2-5 mm, or 2-4 mm, or about 3 mm. Although in some embodiments, the connector may also be cylindrical, in other embodiments the tether 508 may have a square, rectangular, hexagonal, or other cross section as needed by design. In some embodiments, the connector may have a diameter of between 5-50 mm, or between 8-40 mm, or 10-30 mm, or 12-25 mm, or 15-23 mm, or 18-21 mm, or 19-20 mm, or about 19.5 mm. In some embodiments, the disconnect bracket 503 may have a hollow cross section configured to surround the connector (not shown) and configured to transfer force from the disconnect actuator to the necessary part of the connector. In some embodiments, the disconnect actuator may instead comprise a servo motor or any other actuator configurable to transfer force to a connector release.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A system for landing and securing an aircraft in an enclosure, comprising:
   an aircraft having an airframe, the airframe comprising a plurality of elements arranged in a closed shape and defining at least one aperture therethrough;
   an enclosure having a retractable lid, a landing platform, and at least one landing lock element, the at least one landing lock element being configured to controllably move between an opened and a closed position; and
   a controller configured to move the landing lock elements to the closed position, extending at least a portion of the landing lock element through the at least one aperture in the closed shape, when the aircraft has landed on the landing platform;
   the controller further configured to close the lid when the at least one landing lock element is in the closed position.

2. The system of claim 1, wherein the aircraft is communicatively connected to the controller.

3. The system of claim 2, wherein the aircraft is communicatively connected to the controller via a tether.

4. The system of claim 3, wherein the airframe comprises a disconnect bracket connected to the tether, wherein the disconnect bracket comprises a disconnect actuator configured to disconnect the tether.

5. The system of claim 1, wherein the at least one landing lock element comprises a servo.

6. The system of claim 1, wherein the at least one landing lock element comprises at least two landing lock elements.

7. The system of claim 1, wherein the at least one landing lock element comprises a curved retractable rail, the curved retractable rail configured to be positioned in the aperture when in the closed position.

8. The system of claim 7, wherein the curved retractable rail is fixedly attached to a servo, the servo configured to rotate the curved retractable rail out of an opening, through the aperture, and into an adjacent slot when in the closed position.

9. The system of claim 7, wherein the curved retractable rail comprises a wider proximal portion that tapers to a narrower distal portion.

10. The system of claim 1, wherein the controller is configured to raise and lower the landing platform.

11. The system of claim 1, wherein enclosure is mounted on a rotatable platform communicatively connected to the controller, and the controller is configured to reorient the enclosure to match an orientation of the aircraft.

12. The system of claim 1, wherein the airframe comprises at least one shape that matches a shape of a landing cavity in the landing platform.

13. The system of claim 1, wherein the airframe comprises landing gear forming a sloping surface.

14. The system of claim 13, wherein the landing platform comprises a landing cavity with an edge forming a perimeter around the landing cavity, and wherein the sloping surface of the landing gear is configured to slide along the edge to self-center and self-orient the aircraft.

15. The system of claim 14, wherein at least one of the sloping surface of the landing gear or the edge of the landing cavity comprises nylon.

* * * * *